(12) United States Patent
Brodard et al.

(10) Patent No.: US 11,619,275 B2
(45) Date of Patent: Apr. 4, 2023

(54) HEAT SHIELD FOR AN AIRCRAFT BRAKED WHEEL

(71) Applicant: SAFRAN LANDING SYSTEMS, Velizy Villacoublay (FR)

(72) Inventors: Maxime Brodard, Moissy-Cramayel (FR); Jean-Baptiste Robin, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 653 days.

(21) Appl. No.: 16/672,668

(22) Filed: Nov. 4, 2019

(65) Prior Publication Data

US 2020/0141461 A1    May 7, 2020

(30) Foreign Application Priority Data

Nov. 5, 2018 (FR) .................................... 18 60176

(51) Int. Cl.
| | | |
|---|---|---|
| F16D 65/84 | (2006.01) | |
| F16D 65/847 | (2006.01) | |
| B60B 27/00 | (2006.01) | |
| B64C 25/36 | (2006.01) | |
| F16D 65/78 | (2006.01) | |

(52) U.S. Cl.
CPC ........ *F16D 65/847* (2013.01); *B60B 27/0052* (2013.01); *B64C 25/36* (2013.01); *F16D 2065/785* (2013.01); *F16D 2065/788* (2013.01)

(58) Field of Classification Search
CPC ......... B64C 25/36; B64C 25/42; F16D 65/78; F16D 65/785; F16D 65/789; F16D 65/947; F16D 65/2065; F16F 9/19; F16F 9/34; F16F 9/48; F16F 9/49; F16F 9/346; F16F 9/348; F16F 9/512; F16F 9/3235; B60G 17/056; B60G 2202/24; B60G 2204/45
USPC ............. 188/71.5, 71.6, 264 G; 301/6.1, 6.2, 301/6.91; 244/100 R, 110 A, 111
See application file for complete search history.

(56) References Cited

U.S. PATENT DOCUMENTS

| | | | |
|---|---|---|---|
| 4,017,123 A | * | 4/1977 | Horner .................... B60C 23/18 188/264 G |
| 4,084,857 A | | 4/1978 | Vanderveen |
| 4,856,619 A | | 8/1989 | Petersen |

(Continued)

FOREIGN PATENT DOCUMENTS

| | | |
|---|---|---|
| EP | 0 555 822 A1 | 8/1993 |
| EP | 1 304 240 A1 | 4/2003 |

(Continued)

OTHER PUBLICATIONS

French Preliminary Search Report FR 18 60176 dated Aug. 12, 2019.

*Primary Examiner* — Christopher P Schwartz
(74) *Attorney, Agent, or Firm* — Sughrue Mion, PLLC (57) ABSTRACT

An aircraft braked wheel comprising a rim integral with a hub for rotationally mounting thereof on an axle of the aircraft along an axis of rotation, the wheel being equipped with a heat shield (11) extending opposite an inner face of the rim to protect the rim from the thermal radiation generated by a stack of discs extending inside the rim, characterized in that the heat shield has a face facing the discs (15) which has longitudinal ribs (16) extending in operation parallel to the axis of rotation of the wheel.

9 Claims, 7 Drawing Sheets

(56) References Cited

U.S. PATENT DOCUMENTS

| | | | | |
|---|---|---|---|---|
| 5,248,013 | A * | 9/1993 | Hogue | F16D 55/36 |
| | | | | 188/264 G |
| 7,093,697 | B2 * | 8/2006 | Thorp | F16D 65/78 |
| | | | | 188/71.6 |
| 8,523,108 | B2 | 9/2013 | Coty | |
| 8,668,276 | B2 * | 3/2014 | Hall | B64C 25/36 |
| | | | | 301/6.2 |
| 9,718,447 | B2 | 8/2017 | Waltz | |
| 10,738,848 | B2 * | 8/2020 | Gruss | F16D 65/128 |
| 2010/0025172 | A1 * | 2/2010 | Campbell | F16D 65/12 |
| | | | | 188/264 G |
| 2012/0241557 | A1 * | 9/2012 | Coty | F16D 55/40 |
| | | | | 244/100 R |
| 2020/0130818 | A1 * | 4/2020 | Leiva | B64C 25/36 |

FOREIGN PATENT DOCUMENTS

| | | |
|---|---|---|
| EP | 3 159 571 A2 | 4/2017 |
| FR | 2 990 188 A1 | 11/2013 |
| GB | 1 402 534 A | 8/1975 |

\* cited by examiner

HEAT SHIELD FOR AN AIRCRAFT BRAKED WHEEL

The invention relates to a braked wheel equipped with a heat shield to protect the rim from the heat generated by the brake discs

BACKGROUND OF THE INVENTION

The wheels of aircraft main landing gears are generally equipped with brakes that include a stack of discs housed inside the wheel rim. The release of heat due to friction between the discs during braking can be important, and it is known to equip the rims with a heat shield inserted between the rim and the discs to protect the rim and the tyre carried by the rim from this heat influx. Heat shields are generally made of several very thin metal sheets separated by a thin air gap. The purpose of the heat shield is to protect the rim from radiation generated at the interface between the discs.

The evacuation of the heat flow generated by the discs is delicate, given the reduced space left around the discs. In particular, it is known to use a cooling fan in the axle of the wheel whose propeller draws through the openings of the rim wheel disk the air around the discs to organize forced convection. However, not all braked wheels are equipped with such a forced convection device.

This type of active ventilation is effective in reducing aircraft downtime between rotations, but has some disadvantages:

The need to create an electrical circuit to the end of the axle to supply the fan;

The fan must be removed each time the braked wheel is serviced and each time the tyre is changed;

It generates loud noise that can be annoying for ground personnel and passengers passing near the aircraft;

It is a heavy device that contributes to the increase in the aircraft fuel consumption and therefore in the aircraft operating costs;

As an electromechanical device, it is subject to multiple failures (electrical failure, mechanical failure, fouling, shocks, etc.) and contributes to increasing airlines' maintenance costs and reducing aircraft availability (unplanned downtime in the event of a failure);

The massive supply of fresh air to the hot brake discs accelerates their catalytic oxidation, which contributes to the reduction of the brake life and therefore to the increase in aircraft operating costs.

These disadvantages lead airlines to request passive cooling solutions. It was proposed in document FR 2 990 188 to place sloped profile heat shields in the rim to facilitate the evacuation of thermal radiation. However, such a profile requires suitable rims, which is not always possible.

PURPOSE OF THE INVENTION

The invention aims to provide an aircraft braked wheel with a heat shield to evacuate the heat flow generated by the brake discs.

SUMMARY OF THE INVENTION

To achieve this goal, an aircraft braked wheel is proposed with a rim integral with a hub for rotationally mounting thereof on an axle of the aircraft along an axis of rotation, the wheel being equipped with a heat shield extending opposite an inner face of the rim to protect the rim from the thermal radiation generated by a stack of discs extending inside the rim. According to the invention, the heat shield has a face facing the discs which has longitudinal ribs extending in operation parallel to the axis of rotation of the wheel.

These longitudinal ribs define convection paths between them that promote air circulation between the heat shield and the brake discs.

Preferably, the ribs are made in one-piece with the heat shield.

According to a particularly interesting embodiment of the invention, the heat shield includes a plurality of thermal screens (also called petals), each inserted between two rim drive blocks used to drive some of the brake discs into rotation.

According to a particular embodiment of the invention, each thermal screen is extended outside the rim by a radiator, the longitudinal ribs extending under a base plate of the radiator.

Thus, the screens are used as an additional heat sensor, the longitudinal ribs increasing the heat exchange surface of the screen promoting heat absorption which is then conducted to the radiator. The longitudinal ribs also act as a mechanical stiffener, reducing radiator vibration extending overhanging the rest of the screen.

Preferably then, the screen is made of a thermally conductive material, such as an aluminium alloy. If necessary, the surface of the screen facing the discs should be coated with thermal protection to prevent damage by heating but which does not affect the ability of the screen to capture and conduct heat to the radiator.

DESCRIPTION OF THE FIGURES

The invention will be better understood upon reading the following description of one specific embodiment of the invention, and while referring to the appended figures, wherein.

DETAILED DESCRIPTION OF THE INVENTION

The invention relates to heat shields intended to equip an aircraft wheel rim and having a face facing the discs which has longitudinal ribs extending, in operation, parallel to the axis of rotation of the wheel.

The invention is illustrated here by heat shields consisting of thermal screens 11, 111, 211 in three distinct embodiments, inserted between rim drive blocks, all three of which have longitudinal ribs 16, 116, 216 according to the invention. Here, the screen 11 has no finned radiator, whereas the screens 111 and 211 have finned radiators.

First, the principle of mounting these thermal screens on the rim 1 of an aircraft wheel is explained with reference to FIG. 1, and then the three embodiments of these thermal screens will be described in greater details.

Figure 1:
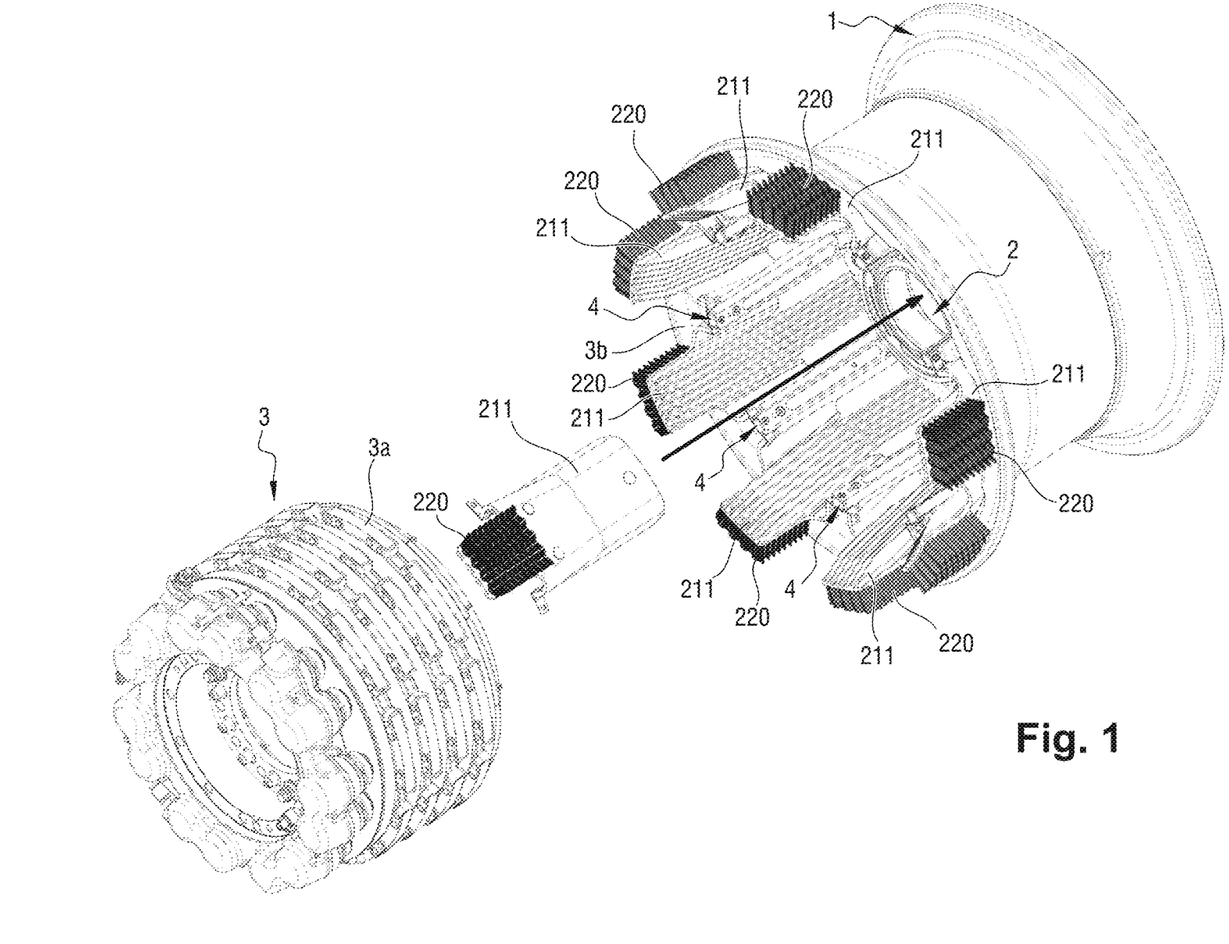
FIG. 1 is a perspective view of a braked wheel equipped with thermal screens of a heat shield according to the invention.

With reference to FIG. 1, the aircraft wheels have a rim 1 intended to receive a tyre, and connected by a wheel disk to a hub 2 for the rotational mounting thereof on an axle about an axis of rotation X. In particular, the wheels of the main landing gears are generally equipped with a brake that includes a stack of discs 3, including rotor discs 3*a* which rotate with the wheel 1, and stator discs 3*b* which are prevented from rotating by cooperation with a torsion tube belonging to the brake. The rotating connection of the rotor discs 3*a* with the rim 1 is provided by means of drive blocks 4 which here are made in one-piece with the rim 1. The rotor discs 3*a* have notches in which the drive blocks 4 are engaged to form obstacles that can cause the rotor discs 3*a* to rotate with the rim 1.

Here, is illustrated the wheel equipped with a heat shield consisting of a succession of thermal screens 211 (also called petals) each extending between two drive blocks to protect the inner surface of the rim from thermal radiation generated by the friction of the discs during braking. In FIG. 1, all thermal screens 211 are shown in position on the wheel except one which is being installed. The thermal screens 211 slide in an axial direction between two drive blocks 4. The same mounting principle applies for the screens 11 and 111.

When the thermal screen is equipped with a finned radiator 220 as here, the latter remains projecting from the rim, the fins facing outwards to radiate outwards and bathing in ambient air.

Three thermal screens according to the invention are now described in greater details.

Figure 2:
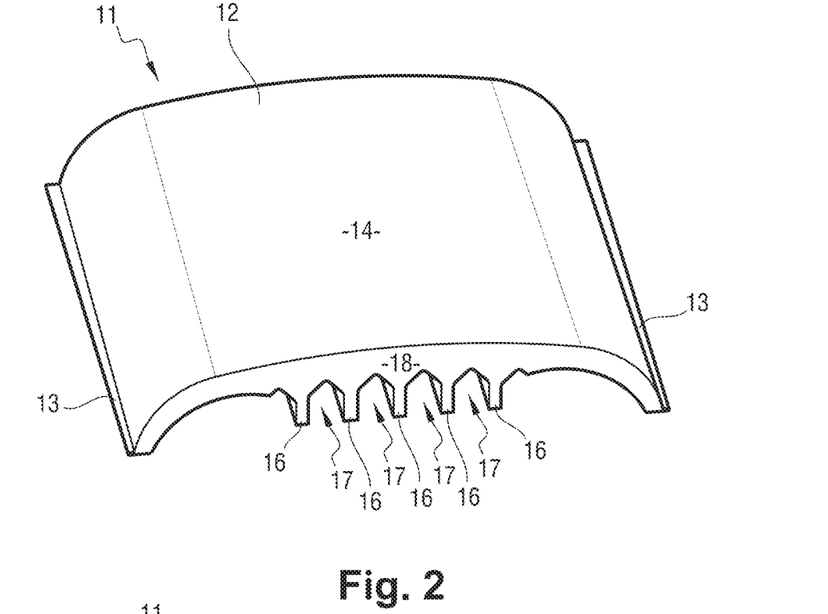
FIG. 2 is a perspective top view of a thermal screen according to a first particular embodiment of the invention.
Figure 3:
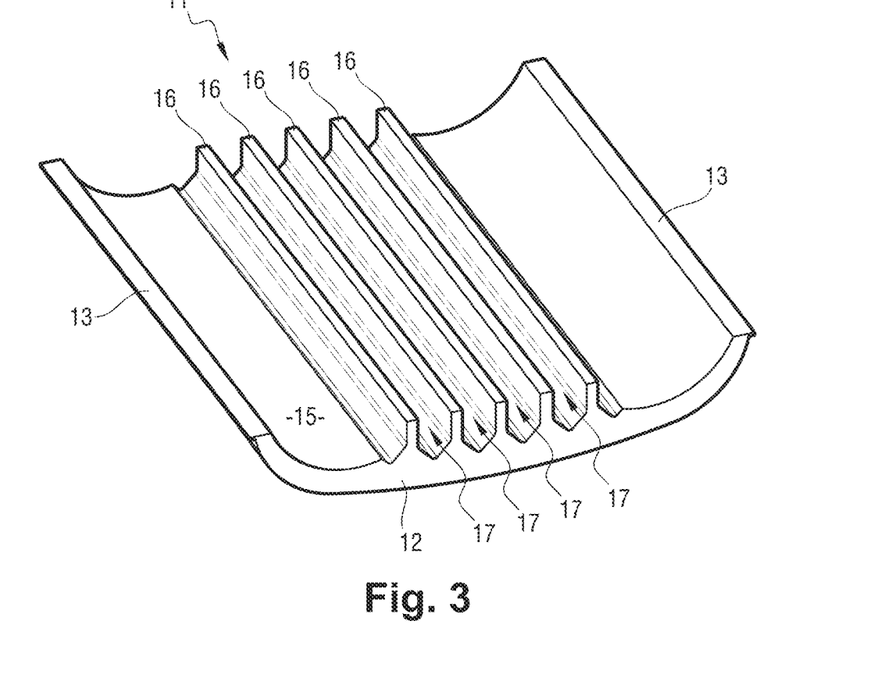
FIG. 3 is a perspective bottom view of the thermal screen of FIG. 2.

With reference to FIGS. 2 and 3, and in accordance with a first embodiment of the invention, each thermal screen 11 comprises a body 12 with two side edges 13 intended to be supported on homologous ledges of the drive blocks 4. Here, the outer face 14 of the body 12 is curved to follow the curvature of the rim. The inner face 15 of the body 12 facing the discs has parallel longitudinal ribs 16 extending, in operation, in the direction of the axis of rotation X of the wheel. These ribs (here seven in number) have several roles:

they define between them convection channels 17 which guide the air heated by the brake discs in an axial direction to facilitate the flow thereof outside the rim, and thus facilitate the cooling of the wheel;

they increase the heat exchange surface presented to the heated air present under the inner face of the screen so that the body 12 of the thermal screen can absorb an increased amount of heat, store it and conduct it to the terminal face 18 of the latter to dissipate it into the ambient air by radiation and convection;

they mechanically stiffen the thermal screen 11.

Thus, the longitudinal ribs 16 organize a convection mode that is added to the radiation mode to facilitate the absorption of heat generated by the brake discs by the thermal screen 11.

Preferably, each thermal screen 11 is made of a heat-conducting material, such as an aluminium alloy, for instance. If necessary, the inner surface 15 should be protected against corrosion (e. g. as an anodic oxidation), and/or equipped with a thermal protection (e. g. ceramic spraying) to prevent damage to said inner surface due to the high temperatures reached by the discs.

Figure 4:
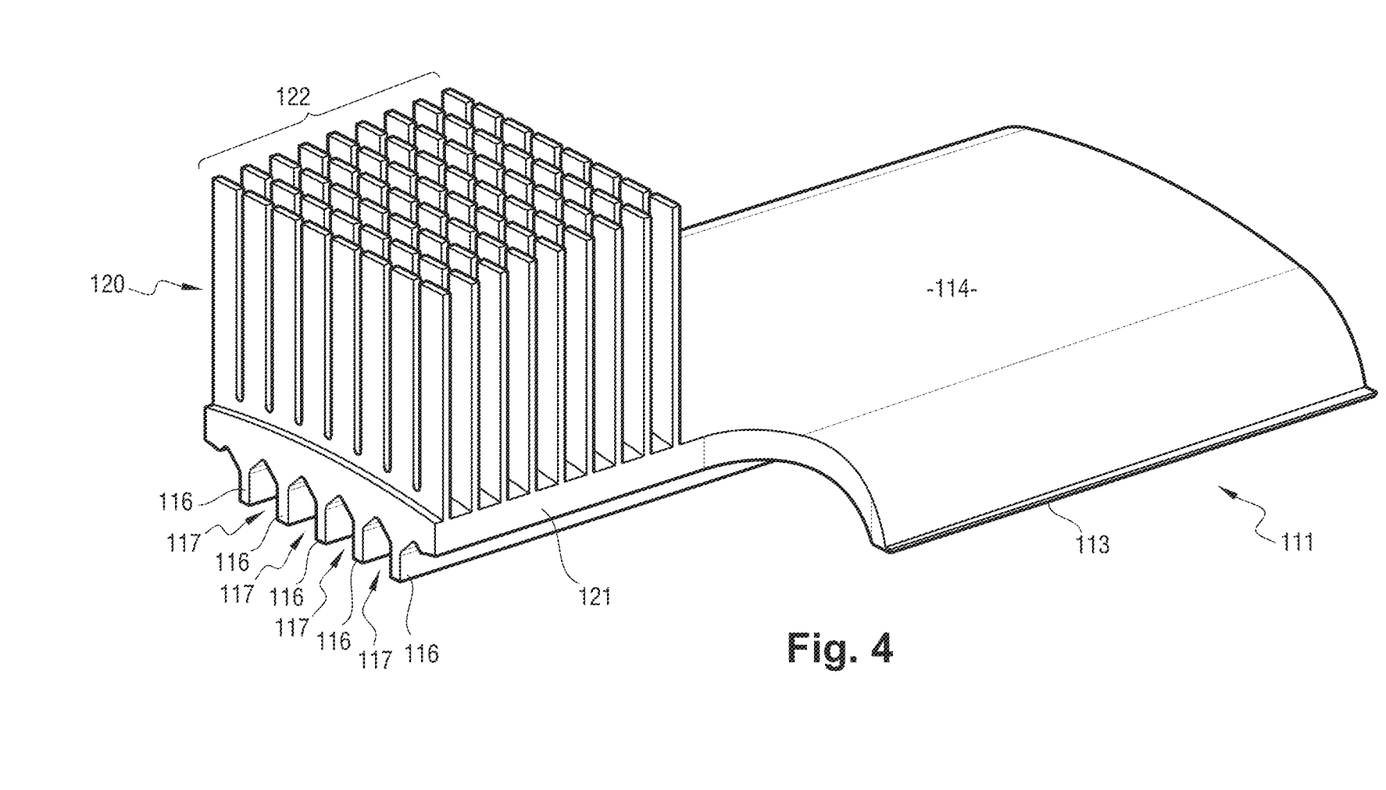
FIG. 4 is a perspective view of a thermal screen equipped with a radiator, according to a second particular embodiment of the invention.
Figure 5:
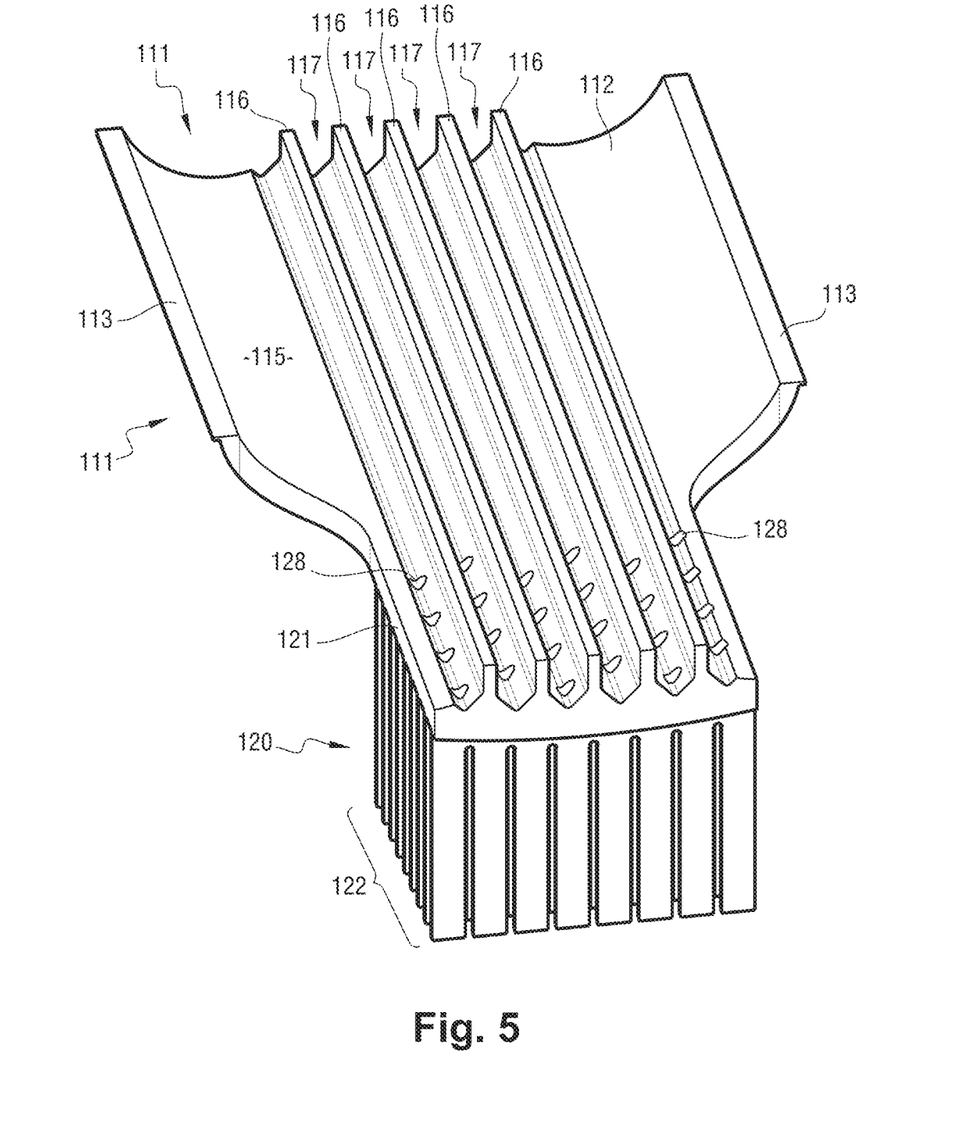
FIG. 5 is a perspective bottom view of the thermal screen of FIG. 4.

In a second particular embodiment illustrated in FIGS. 4 and 5 on which the common elements have a reference increased by a hundred, the ability to dissipate the heat absorbed by the body 112 of the thermal screen 111 is significantly increased by equipping the thermal screen with a radiator 120 comprising a base plate 121 which extends as an extension of the body 112 beyond the rim of the wheel to receive, on its outer surface, fins 122 which contribute to substantially increasing the surface area for dissipation of the heat absorbed by the body of the thermal screen, thus increasing the transfer of heat by convection and radiation to the surrounding air. The fins 122 rotate with the wheel, and the rotation of the wheel helps to create a turbulent convective flow around the fins that accelerates the dissipation of heat transferred by the thermal screens 111 of the brake discs to the outside.

Here, the fins 122 extend, in operation, in planes P perpendicular to the axis of rotation X of the wheel, outside the rim of the wheel. The fins 122 are organized here in nine straight rows of eight fins. The fins 122 here are made in one-piece with the rest of the screen 111 and project from the outer face of the base plate 121.

The thermal screen 11 is also equipped with ribs 116, which have the same advantages as before. Here, and in a particularly advantageous arrangement of the invention, the ribs 116 extending from the face 115 opposite the discs extend under the base plate 121 to stiffen the thermal screen 11 and reduce the risk of vibration of the radiator 120 which extends overhanging the body 112. According to a special provision, the base plate 121 is pierced with through holes 128 (only some of them are referenced for greater clarity) allowing air channelled by the ribs 116 into the convection channels 117 to flow between the fins 122 from the inner face 115 of the thermal screen. These through holes 128 are arranged in staggered rows.

The fins 122 may take any shape suitable for promoting heat dissipation by convection and radiation. The following embodiment will show another type of fins, which can quite easily be used on the thermal screen 111.

With reference now to FIGS. 6 to 10, on which the references of the common elements have been further increased by 100, the invention also applies to a thermal screen 211 adapted to a wheel as illustrated in document FR2990188 the rim of which has an at least partly sloping profile. Thus, the body 212 of the thermal screen 211 has a first part 212A similar to the thermal screen 11, being extended by a second part 212B which rises in a slightly tapered way above the side edges 213 to follow the slope of the rim and thus present, opposite the discs, an inner face 215 a part of which is inclined, suitable to facilitate the evacuation of the air heated by the discs and the reflection of radiation outside the wheel.

As in the previous embodiment, longitudinal ribs 216 extend, according to the invention, on the inner face 215 of the screen. The body 212 is extended by a radiator 220 with a base plate 221 which extends as an extension of the second part 212B of the body 212 and is topped by fins 222. The longitudinal ribs 216 extend under the base plate 221. Here, two side ribs 219, parallel to the longitudinal ribs 216, extend on either side of the longitudinal ribs 216 to stiffen the sides of the radiator 220.

Here, the fins 222 are arranged in nine rows according to a corrugated profile defining corrugated convection channels 225 between them. Each fin 222 is here wider at its root 223 than at its head 224 so as to have a trapezoidal cross-section, and the side surfaces 229 of the fins 222 are striated. These provisions contribute to increasing heat exchange by convection with the ambient air.

As in the previous example, holes 228 are arranged in staggered rows through the radiator base plate 221 to open between the fins allowing air channelled through the ribs 216 into the convection channels 217 to flow between the fins 222 from the inner face 215 of the thermal screen.

Figure 6:
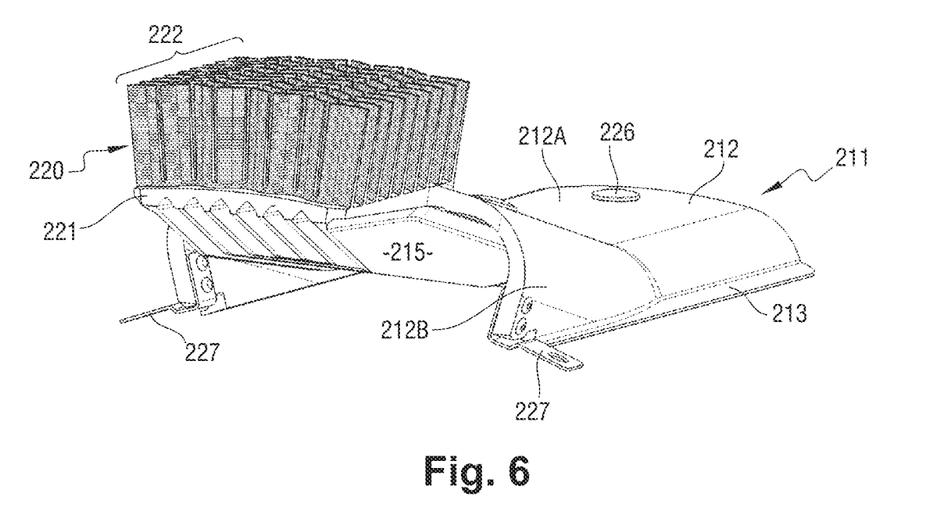
FIG. 6 is a perspective view of a thermal screen equipped with a radiator according to a third particular embodiment of the invention adapted to a rim with a sloping profile.
Figure 7:
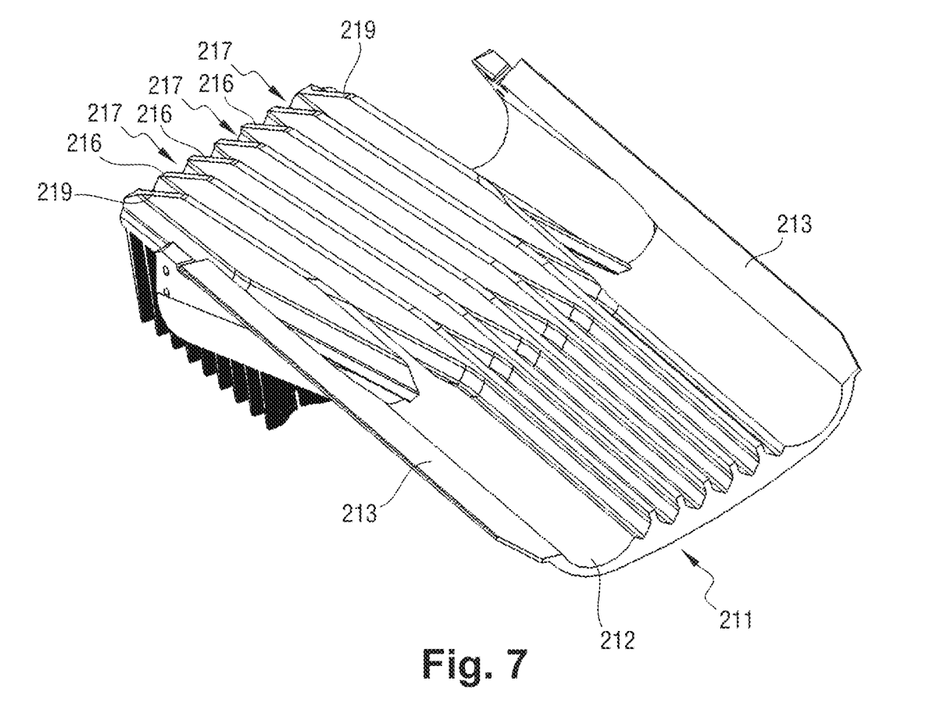
FIG. 7 is a perspective bottom view of the thermal screen of FIG. 6.
Figure 8:
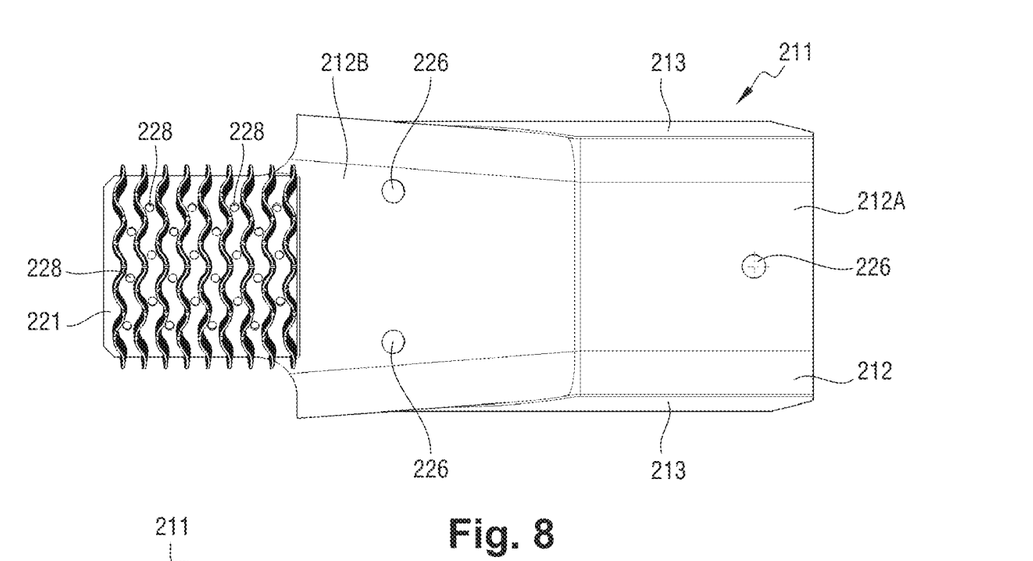
FIG. 8 is a top view of the thermal screen of FIG. 6
Figure 9:
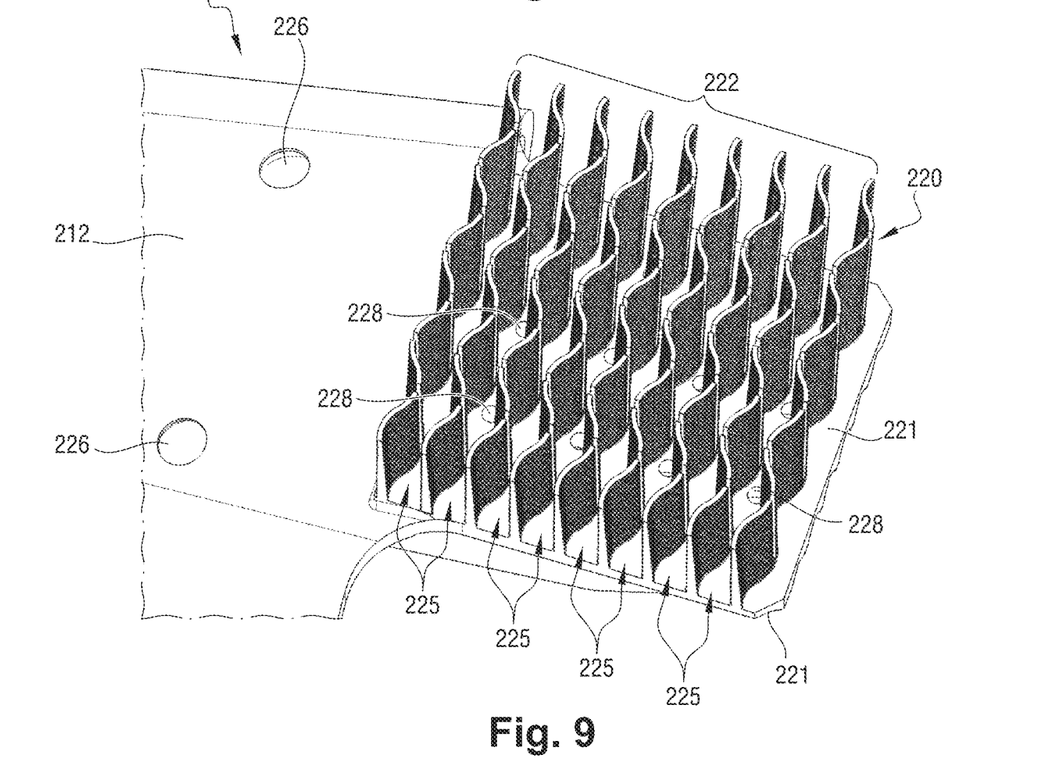
FIG. 9 is a perspective detailed view showing the fins of the thermal screen of FIG. 6.
Figure 10:
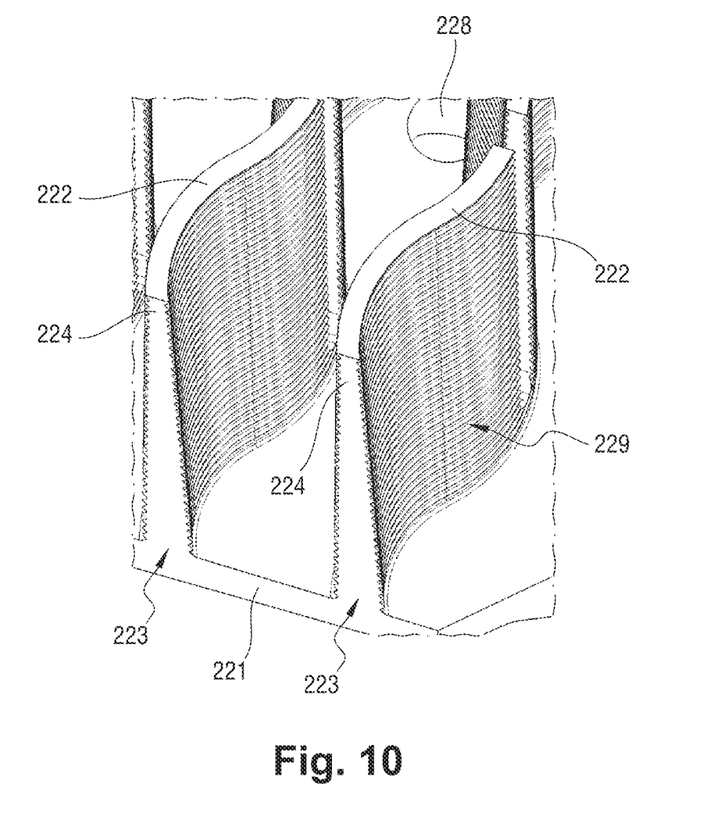
FIG. 10 is a still enlarged detailed view of the fins of the thermal screen of FIG. 6.

Here, silicone elastomer pads 226 allow the thermal screen 211 to be supported against the wheel rim. Clamps 227 located at the accessible end of the ledges 213 allow the screen 211 to be attached to the wheel drive blocks.

To optimise their action, the longitudinal ribs 16, 116, 216 are preferably made according to at least one of the following dimensional characteristics:
 thickness between 1 and 6 mm;
 height between 5 and 50 mm;
 spacing between 3 and 20 mm;
 Similarly, the fins 122, 222 are preferably made according to at least one of the following dimensional characteristics:
 height between 10 and 60 mm;
 thickness (measured at their roots) between 0.5 and 6 mm;
 spacing between 3 and 20 mm;

The invention is not limited to what has just been described, but encompasses every alternative solution within the scope of the claims.

In particular, although here the heat shield is in the form of a plurality of screens or petals inserted between the rim drive blocks, it may be possible to provide a shield consisting of other parts, or even made of a single-piece, as long as it has longitudinal grooves on its face opposite the brake discs, according to the invention.

Although the screens here are made in a single-piece, multi-part shields can be made, for example a stainless steel support receiving a thermally conductive portion can be provided.

The invention claimed is:

1. An aircraft braked wheel comprising a rim integral with a hub for rotationally mounting thereof on an axle of an aircraft along an axis of rotation, the aircraft braked wheel being equipped with a heat shield extending opposite an inner face of the rim to protect the rim from thermal radiation generated by a stack of discs extending inside the rim, wherein the heat shield has a face facing the discs which has longitudinal ribs extending in operation parallel to the axis of rotation of the wheel, from one edge to another of the heat shield.

2. The aircraft braked wheel according to claim 1, the heat shield of which comprises a plurality of thermal screens each inserted between two drive blocks of the wheel, each of the plurality of thermal screens comprising a body bordered by side flanges enabling support thereof on the two drive blocks, the longitudinal ribs extending to project from an inner face of the body facing the discs.

3. The aircraft braked wheel according to claim 1, wherein the longitudinal ribs have at least one of the following characteristics:
 thickness between 1 and 6 mm;
 height between 5 and 50 mm;
 spacing between 3 and 20 mm.

4. The aircraft braked wheel according to claim 1, wherein the heat shield comprises thermal screens each having a finned radiator which extends as an extension of a body of the thermal screen, the longitudinal ribs extending under a base plate of the finned radiator.

5. The aircraft braked wheel according to claim 4, wherein fins of the finned radiator are arranged in rows extending in planes P perpendicular to the axis of rotation.

6. The aircraft braked wheel according to claim 5, wherein the rows extend along a straight profile or a corrugated profile.

7. The aircraft braked wheel according to claim 4, wherein fins of the finned radiator are made according to at least one of the following dimensional characteristics:
 height between 10 and 60 mm;
 thickness (measured at their roots) between 0.5 and 6 mm;
 spacing between 3 and 20 mm.

8. The aircraft braked wheel according to claim 4, wherein the base plate has through holes allowing air channeled into convection channels extending between the longitudinal ribs to flow between fins of the finned radiator.

9. The aircraft braked wheel according to claim 8, wherein the through holes are arranged in staggered rows.

* * * * *